(12) United States Patent
Kelty et al.

(10) Patent No.: US 8,543,270 B2
(45) Date of Patent: *Sep. 24, 2013

(54) EFFICIENT DUAL SOURCE BATTERY PACK SYSTEM FOR AN ELECTRIC VEHICLE

(75) Inventors: Kurt Russell Kelty, Palo Alto, CA (US); Vineet Haresh Mehta, San Francisco, CA (US); Jeffrey Brian Straubel, Menlo Park, CA (US)

(73) Assignee: Tesla Motors, Inc., Palo Alto, CA (US)

( * ) Notice: Subject to any disclaimer, the term of this patent is extended or adjusted under 35 U.S.C. 154(b) by 410 days.

This patent is subject to a terminal disclaimer.

(21) Appl. No.: 12/964,767

(22) Filed: Dec. 10, 2010

(65) Prior Publication Data

US 2012/0041625 A1 Feb. 16, 2012

Related U.S. Application Data

(63) Continuation of application No. 12/962,693, filed on Dec. 8, 2010.

(60) Provisional application No. 61/372,351, filed on Aug. 10, 2010.

(51) Int. Cl.
 *B60L 11/18* (2006.01)
 *B60L 3/08* (2006.01)
 *G05D 3/00* (2006.01)

(52) U.S. Cl.
 USPC .... 701/22; 180/65.1; 180/65.29; 180/65.265; 320/125; 903/903; 903/907

(58) Field of Classification Search
 USPC ........... 701/22, 99; 180/65.1, 65.29, 65.265, 180/65.8; 903/903, 907; 320/125, 135, 136
 See application file for complete search history.

(56) References Cited

U.S. PATENT DOCUMENTS

| | | | | |
|---|---|---|---|---|
| 5,898,282 A | * | 4/1999 | Drozdz et al. | 318/139 |
| 5,905,360 A | | 5/1999 | Ukita | |
| 6,687,581 B2 | * | 2/2004 | Deguchi et al. | 701/22 |
| 6,793,027 B1 | | 9/2004 | Yamada et al. | |
| 7,349,797 B2 | * | 3/2008 | Donnelly et al. | 701/115 |
| 7,532,960 B2 | | 5/2009 | Kumar | |
| 7,933,695 B2 | * | 4/2011 | Yamaguchi | 701/22 |
| 8,180,512 B2 | * | 5/2012 | Kelty et al. | 701/22 |
| 8,190,320 B2 | * | 5/2012 | Kelty et al. | 701/22 |
| 2003/0106726 A1 | * | 6/2003 | Yoshii | 180/65.1 |
| 2005/0052080 A1 | * | 3/2005 | Maslov et al. | 307/10.1 |
| 2008/0027639 A1 | | 1/2008 | Tryon | |
| 2008/0245587 A1 | | 10/2008 | Sastry et al. | |
| 2009/0322503 A1 | | 12/2009 | Suzuki et al. | |
| 2010/0138142 A1 | | 6/2010 | Pease | |
| 2010/0174484 A1 | | 7/2010 | Sivasubramaniam et al. | |

OTHER PUBLICATIONS

Boyd, Steven J. "Hybrid electric vehicle control strategy based on power loss calculations." Virginia Polytechnic Institute and State University (2006).*

* cited by examiner

*Primary Examiner* — Christine Behncke
(74) *Attorney, Agent, or Firm* — Patent Law Office of David G. Beck

(57) ABSTRACT

A method of optimizing the operation of the power source of an electric vehicle is provided, where the power source is comprised of a first battery pack (e.g., a non-metal-air battery pack) and a second battery pack (e.g., a metal-air battery pack). The power source is optimized to minimize use of the least efficient battery pack (e.g., the second battery pack) while ensuring that the electric vehicle has sufficient power to traverse the expected travel distance before the next battery charging cycle.

40 Claims, 12 Drawing Sheets

EFFICIENT DUAL SOURCE BATTERY PACK SYSTEM FOR AN ELECTRIC VEHICLE

CROSS-REFERENCE TO RELATED APPLICATION

The present application is a continuation-in-part of U.S. patent application Ser. No. 12/962,693, filed Dec. 8, 2010, and claims benefit of the filing date of U.S. Provisional Patent Application Ser. No. 61/372,351, filed Aug. 10, 2010, the disclosures of which are incorporated herein by reference for any and all purposes.

FIELD OF THE INVENTION

The present invention relates generally to batteries and, more particularly, to means for optimizing the power source of an electric vehicle that utilizes battery packs of differing types.

BACKGROUND OF THE INVENTION

A metal-air cell is a type of battery that utilizes the same energy storage principles as a more conventional cell such as a lithium ion, nickel metal hydride, nickel cadmium, or other cell type. Unlike such conventional cells, however, a metal-air cell utilizes oxygen as one of the electrodes, typically passing the oxygen through a porous metal electrode. The exact nature of the reaction that occurs in a metal-air battery depends upon the metal used in the anode and the composition of the electrolyte. Exemplary metals used in the construction of the anode include zinc, aluminum, magnesium, iron, lithium and vanadium. The cathode in such cells is typically fabricated from a porous structure with the necessary catalytic properties for the oxygen reaction. A suitable electrolyte, such as potassium hydroxide in the case of a zinc-air battery, provides the necessary ionic conductivity between the electrodes while a separator prevents short circuits between the battery electrodes.

Due to the use of oxygen as one of the reactants, metal-air cells have some rather unique properties. For example, since the oxygen does not need to be packaged within the cell, a metal-air cell typically exhibits a much higher capacity-to-volume, or capacity-to-weight, ratio than other cell types making them an ideal candidate for weight sensitive applications or those requiring high energy densities.

While metal-air cells offer a number of advantages over a conventional rechargeable battery, most notably their extremely high energy density, such cells also have a number of drawbacks. For example, care must be taken to avoid the undesired evaporation of electrolyte, especially in high temperature, low humidity environments. It is also necessary to ensure that there is a sufficient supply of air to the cells during discharge cycles, and means for handling the oxygen emitted from the cells during the charge cycles. Another potential disadvantage of a metal-air cell is the power available on discharge. Due to the kinetics of the electrode reactions, the maximum discharge rate is far lower than that of many other types of cells, such as lithium-ion cells.

Accordingly, while metal-air cells offer some intriguing benefits, such as their high energy densities, their shortcomings must be taken into account in order to successfully integrate the cells into a system. The present invention provides such a system by combining a metal-air battery pack with a conventional battery pack in order to gain the benefits associated with each battery type.

SUMMARY OF THE INVENTION

The present invention provides a method of optimizing the operation of the power source of an electric vehicle, the power source comprised of a first battery pack (e.g., a non-metal-air battery pack) and a second battery pack (e.g., a metal-air battery pack). The power source is optimized to minimize use of the least efficient battery pack (e.g., the second battery pack) while ensuring that the electric vehicle has sufficient power to traverse the expected travel distance before the next battery charging cycle. Further optimization may be achieved by setting at least one acceleration limit and/or at least one maximum speed limit based on vehicle efficiency and the state-of-charge (SOC) of the first and second battery packs.

In at least one embodiment of the invention, a method of optimizing the power source of an electric vehicle is provided, the power source including at least a first battery pack (e.g., non-metal-air battery pack) and a second battery pack (e.g., metal-air battery pack), the method including the steps of (a) determining the SOC of the first and second battery packs; (b) determining vehicle efficiency; (c) obtaining the expected distance to travel before the next charging cycle; (d) determining the optimal split between the first and second battery packs to minimize use of the second battery pack while still providing the electric vehicle sufficient power to traverse the expected travel distance; and (e) providing power to the electric vehicle in accordance with the optimal split. The step of determining the optimal split may further comprise the step of maintaining a minimum SOC within the first battery pack. The step of determining the optimal split may further comprise the step of maximizing power source efficiency. The method may further include the steps of (f) monitoring current SOC for the first and second battery packs; (g) comparing the current first and second battery pack SOCs to first and second battery pack predicted use profiles; (h) determining a revised optimal split if the current first battery pack SOC does not approximately match the first battery pack predicted use profile or the current second battery pack SOC does not approximately match the second battery pack predicted use profile; (i) and providing power to the electric vehicle in accordance with the revised optimal split. The method may further include the steps of (f) monitoring current SOC for the first and second battery packs; (g) determining remaining SOC for the first and second battery packs; (h) comparing the remaining first and second battery pack SOCs to first and second battery pack predicted use profiles; (i) determining a revised optimal split if the remaining first battery pack SOC does not approximately match the first battery pack predicted use profile or the remaining second battery pack SOC does not approximately match the second battery pack predicted use profile; (i) and providing power to the electric vehicle in accordance with the revised optimal split. The method may further include the steps of monitoring traffic conditions and adjusting vehicle efficiency based on the traffic conditions. The method may further include the step of determining battery pack operational parameters prior to determining the optimal split. The vehicle efficiency may be (i) the average conversion efficiency for the electric vehicle; (ii) given as a function of vehicle speed and vehicle acceleration; and/or (iii) corresponding to a particular driver. The travel distance may be determined from (i) a preset distance; (ii) a destination input into the vehicle's navigation system; or (iii) a travel itinerary input into the vehicle's navigation system. The method may further include the steps of estimating vehicle elevation variations or traffic conditions based on a travel itinerary input into the vehicle's navigation system and adjusting the vehicle efficiency based on the elevation variations or traffic conditions. The method may further include the steps of determining ambient temperature, estimating battery pack cooling demands based on the ambient temperature, and adjusting vehicle efficiency based on the cooling demands. The method may further include the steps of estimating vehicle weight and adjusting vehicle efficiency based on vehicle weight. The method may further include the steps of determining ambient lighting conditions, estimating driving light requirements based on ambient lighting conditions, estimating battery pack loading to meet driving light requirements, and adjusting vehicle efficiency based on battery pack loading. The method may further include the steps of determining weather conditions and adjusting vehicle efficiency based on the weather conditions. The method may further include the steps of identifying the driver, estimating auxiliary battery pack loading corresponding to the driver, and adjusting vehicle efficiency based on the estimated auxiliary battery pack loading.

A further understanding of the nature and advantages of the present invention may be realized by reference to the remaining portions of the specification and the drawings.

DESCRIPTION OF THE SPECIFIC EMBODIMENTS

In the following text, the terms "battery", "cell", and "battery cell" may be used interchangeably. The term "battery pack" as used herein refers to one or more individual batteries that are electrically interconnected to achieve the desired voltage and capacity for a particular application, the individual batteries typically contained within a single piece or multi-piece housing. The term "electric vehicle" as used herein refers to either an all-electric vehicle, also referred to as an EV, plug-in hybrid vehicles, also referred to as a PHEV, or a hybrid vehicle (HEV), a hybrid vehicle utilizing multiple propulsion sources one of which is an electric drive system. It should be understood that identical element symbols used on multiple figures refer to the same component, or components of equal functionality. Additionally, the accompanying figures are only meant to illustrate, not limit, the scope of the invention and should not be considered to be to scale.

Figure 1:
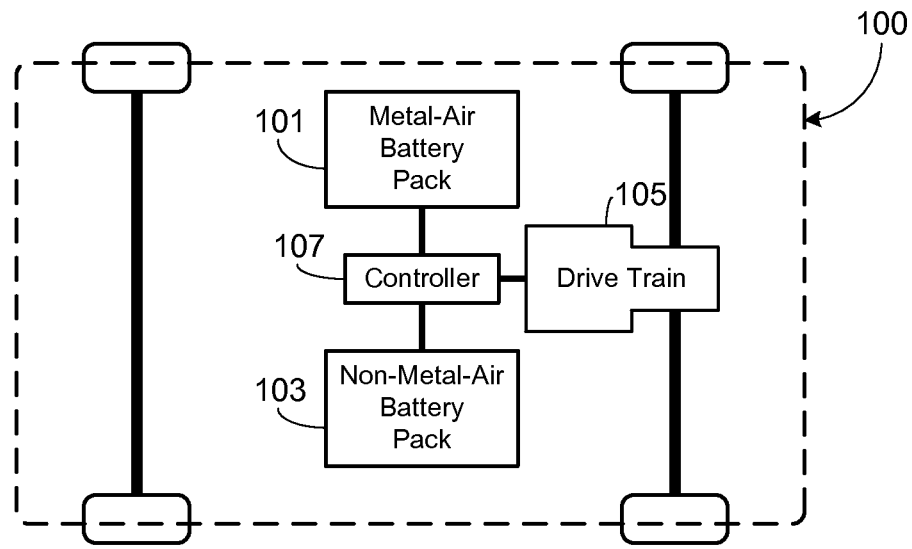
FIG. 1 illustrates the primary components of an electric vehicle that utilizes both a metal-air battery pack and a conventional battery pack.

Given the high energy density and the large capacity-to-weight ratio offered by metal-air cells, they are well suited for use in electric vehicles. Due to their limited power density, however, their use is most appropriate when combined with a more conventional power source, such as a lithium ion battery pack. This aspect is illustrated in FIG. 1 which shows the primary components of an EV 100 that utilizes both a metal-air battery pack 101 and a conventional, non-metal-air battery pack 103. As used herein, metal-air batteries refer to any cell that utilizes oxygen as one of the electrodes and metal (e.g., zinc, aluminum, magnesium, iron, lithium, vanadium, etc.) in the construction of the other electrode. Conventional battery pack 103 utilizes non-metal-air cells, and preferably ones that provide high power density, thus providing a combined power source that achieves an optimal combination of energy and power. Exemplary batteries used in conventional battery pack 103 include, but are not limited to, lithium ion (e.g., lithium iron phosphate, lithium cobalt oxide, other lithium metal oxides, etc.), lithium ion polymer, nickel metal hydride, nickel cadmium, nickel hydrogen, nickel zinc, silver zinc, etc. In a preferred application, battery packs 101 and 103 are coupled to one or more drive motors 105 that provide propulsion to one or more wheels of EV 100. A controller 107 optimizes the vehicle's dual power source, i.e., battery packs 101 and 103, in light of the current battery pack conditions (e.g., state-of-charge, temperature, etc.), preferred battery pack charge/discharge conditions, and the various operating conditions. Exemplary operating conditions include those placed on the system by the user (e.g., distance, speed, acceleration, etc.), road conditions (e.g., uphill, downhill, traffic, etc.), charging system (e.g., available power, available time for charging, etc.), and environmental conditions (e.g., ambient temperature, humidity, etc.).

Figure 2:
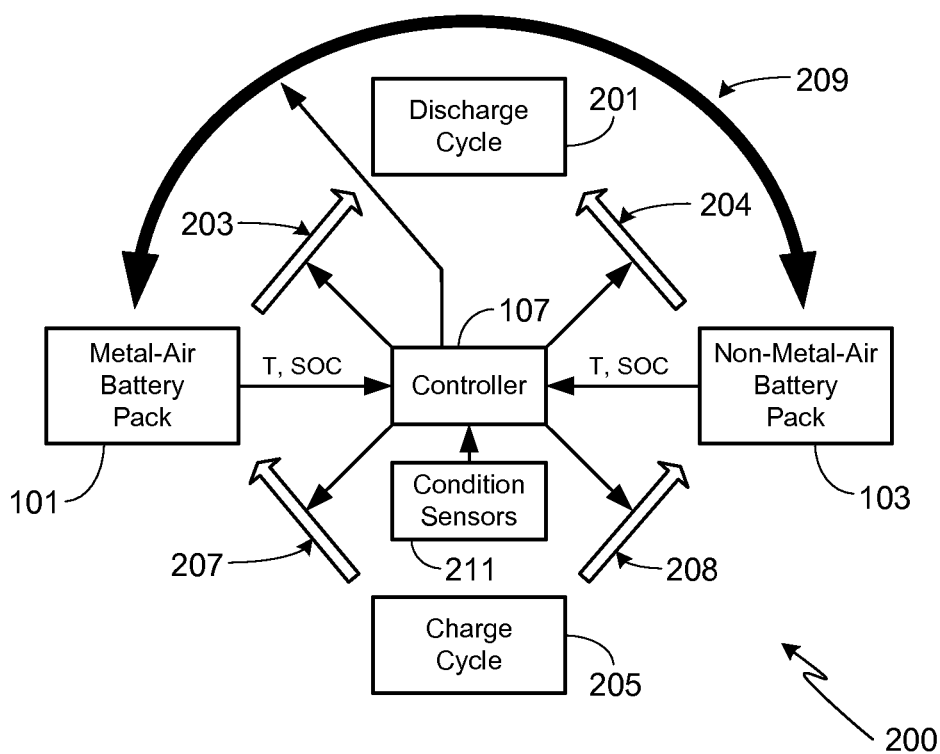
FIG. 2 illustrates the basic methodology of the invention.

FIG. 2 illustrates the basic application of the dual source battery system of the invention. As shown, during the discharge cycle 201 one or both battery packs 101 and 103 provide energy to the intended application (e.g., propulsion, cooling, auxiliary systems, etc.), the flow of energy represented by paths 203/204. Similarly, during the charging cycle 205 one or both battery packs 101 and 103 receive energy from a charging source, not shown, the flow of energy represented by paths 207/208. The charging source may be an external power source (e.g., power grid) or an internal power source (e.g., regenerative system). Lastly, in some embodiments energy may be transferred directly between battery packs 101 and 103 as represented by energy flow pathway 209.

In accordance with the invention, and as illustrated in system 200, controller 107 controls the flow of energy to and from both the metal-air battery pack 101 and the non-metal-air battery pack 103. As described in detail below, the methodology applied by controller 107 is based on the input from a variety of sensors 211 as well as the current operating conditions (e.g., temperature and state-of-charge (SOC), etc.) of both battery packs.

The primary advantage of using two different types of battery packs, and more specifically, a metal-air battery pack 101 and a conventional, non-metal-air battery pack 103, is that as the operational characteristics of the two battery types are quite different, an EV utilizing both battery types can be designed to take advantage of the benefits of both battery types, while significantly limiting the negative effects of either type.

While the specific operating requirements and characteristics of the two battery packs will depend upon the particular chemistries of the cells selected for each battery pack, the basic differences between the two types are provided below, thus further clarifying how the present invention utilizes both battery types to optimize operation of the combined power source.

Energy Density—The energy density of metal-air cells is very high, even relative to high density non-metal-air cells such as lithium-ion cells. In general, this is the result of the metal-air cells utilizing oxygen, contained within the air, as one of the reactants, thus reducing cell weight and increasing energy density. Accordingly, in weight sensitive applications such as EVs, metal-air cells offer a distinct advantage over non-metal-air cells in terms of energy density.

Power Density—The power density of a cell is determined by the cell's reaction kinetics. Currently the chemistries, materials and configurations used in metal-air cells provide a lower power density and discharge rate than that achieved by many non-metal-air cells. While the lower power density and discharge rate is adequate for many applications, it is lower than desired for more demanding applications. As a result, by combining both cell types in a single application as presently described, the high energy density, moderate power density metal-air cells can provide a baseline power source while the moderate energy density, high power density non-metal-air cells can provide the necessary power for peak loads, for example the loads that may be experienced during acceleration, high speed, and hill climbing. Clearly the relative sizes allocated for each battery type/pack within an EV depends upon the configuration and design of the vehicle (i.e., vehicle weight; performance, range and cost goals; etc.).

Optimal Charge/Discharge Temperatures—Temperature affects many critical characteristics of battery operation regardless of the battery type/chemistry. Exemplary characteristics affected by temperature include cell voltage and discharge capacity, cell impedance, cell life, non-recoverable capacity loss (at high temperatures), and charging efficiency. While the preferred and optimal charge and discharge characteristics depend upon the particular cell design, chemistry, and reaction kinetics, in general metal-air cells may be charged and discharged over a wider temperature range than non-metal-air cells without unduly affecting cell life and efficiency.

State-of-Charge (SOC)—The depth of discharge reached during the discharge cycle, and the level that a cell is charged (up to 100%) during the charge cycle, may dramatically affect the performance and life characteristics of a cell. These characteristics are dependent upon cell design and chemistry.

Charging Characteristics—By definition a rechargeable battery is rechargeable, however, the number of times that a cell may be recharged without substantially affecting the capabilities and lifetime of the cell vary greatly with cell design and chemistry. In general, however, current state-of-the-art metal-air cells are not capable of being recharged as many times as a non-metal-air cell without causing a significant degradation in lifetime and capacity. Additionally, the charging efficiency of current metal-air cells is typically worse than that associated with non-metal-air cells.

In order to improve upon the efficiency of an electric vehicle that uses a dual power source, i.e., a power source utilizing two different types of batteries, the present invention minimizes the use of the least efficient of the two battery types. Thus, for example, assuming a power source that utilizes both a first battery pack comprised of non-metal-air cells and a second battery pack comprised of metal-air cells, during vehicle operation the present invention minimizes the discharge of the metal-air cells. By minimizing the use of the metal-air cells, the effects of this cell's lower power density and inferior cycle life and charge efficiency are minimized. It should be understood, however, that the relative performance of metal-air and non-metal-air cells with respect to power density, cycle life and charge efficiency may be reversed at some point in the future due, for example, to future improvements in metal-air cell chemistry and design. If such a reversal in performance were to occur, it will be appreciated that the composition of the first and second battery packs of the invention would be reversed, thus still optimizing the vehicle's efficiency.

Figure 3:
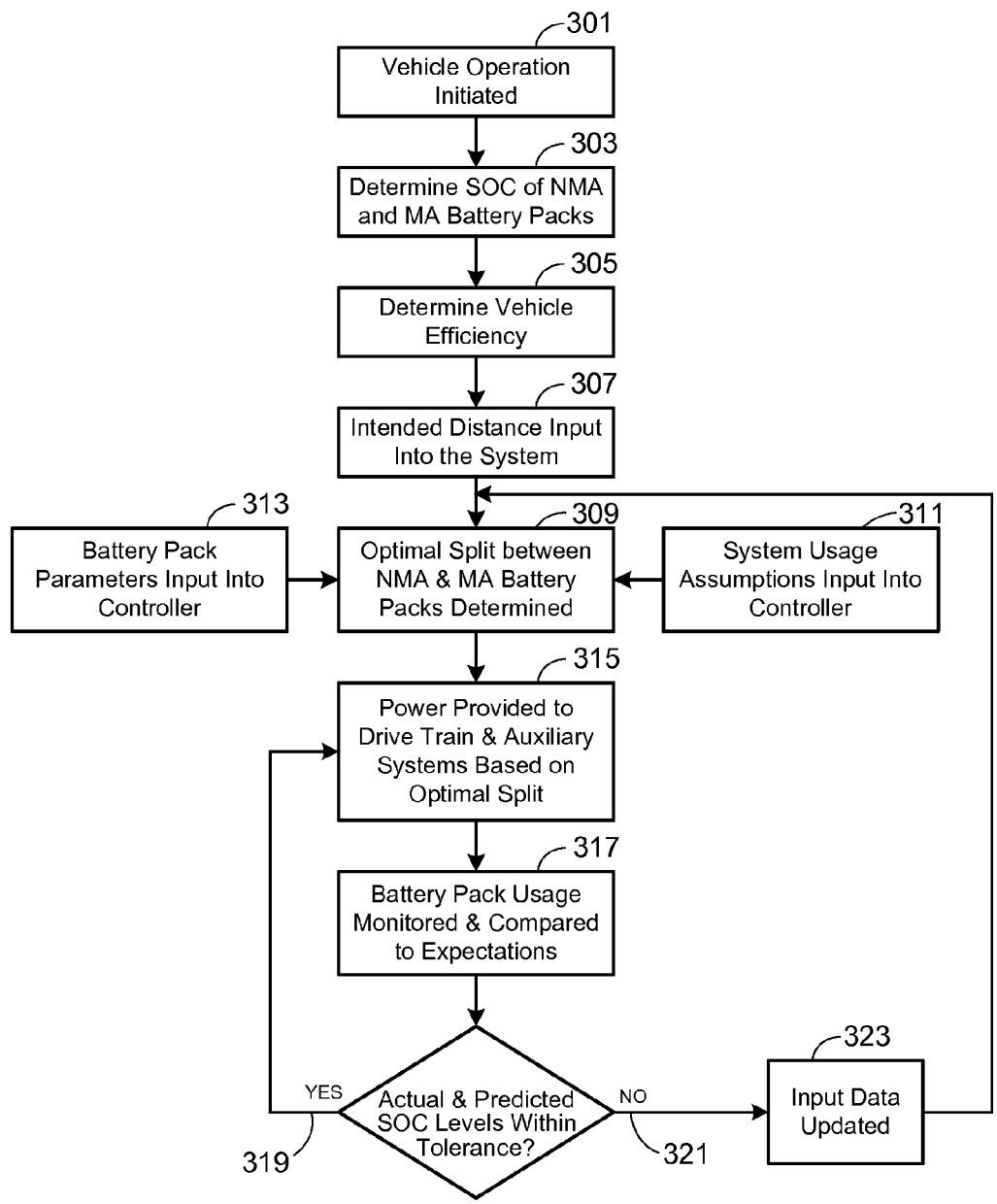
FIG. 3 illustrates the methodology of a preferred embodiment.

FIG. 3 illustrates the basic methodology associated with a preferred embodiment of the invention. The illustrated process assumes, as previously noted, a power source comprised of at least two battery packs of different battery types, e.g., a first battery pack comprised of non-metal-air cells and a second battery pack comprised of metal-air cells. As shown, once vehicle operation is initiated (step 301), the state-of-charge (SOC) of both non-metal-air battery pack 103 and metal-air battery pack 101 are determined (step 303). Note that in the figures "non-metal-air" is abbreviated as "NMA" and "metal-air" is abbreviated as "MA". In step 305 the system determines the efficiency of the vehicle. In this context, efficiency refers to the vehicle's efficiency in converting the output from the vehicle's power source, i.e., from each of the battery packs comprising the dual battery pack source, to actual miles traveled, and is given in terms of watt-hours/mile or equivalent metric units. The vehicle's efficiency is driven by both the electrical conversion efficiency and the thermal dissipation characteristics of each of the battery packs, each varying as a function of speed and acceleration. It will be appreciated that the ability of the present invention to optimize use of the vehicle's dual battery packs depends, in part, on the accuracy of the efficiency input into the system controller and there are clearly numerous techniques for determining and/or inputting efficiency into the system. For example, the efficiency may be based on an average conversion efficiency, or the efficiency may be comprised of a look-up table (or similar form of data input) that provides the instantaneous efficiency as a function of speed and acceleration. Additionally, the efficiency data may be provided for the particular make and model of the vehicle; alternately, based on efficiency data for the particular vehicle in question; alternately, based on efficiency data gathered for the particular vehicle in question and for a relatively recent period of time (e.g., for the last month or week; for the last 100 miles or 50 miles the vehicle was driven; etc.). In at least one embodiment, the efficiency data is stored in a memory (e.g., EPROM, EEPROM, flash memory, RAM, a solid state disk drive, a hard disk drive, or any other memory type or combination of memory types) associated with controller 107. The memory may also be used to store other system operating parameters as well as process instructions.

Next, in step 307, the intended distance for vehicle 100 to travel before the next, expected charging cycle is input into the system. As described in detail below, this distance may be input directly into the system by the user (e.g., driver); alternately, the distance may be input indirectly by the user's interaction with the vehicle's navigation system; alternately, the distance may be based on historical data; alternately, the distance may be based on a preset set of requirements and assumptions. Clearly the extent to which the system may optimize use of the vehicle's dual battery packs depends on the accuracy of the distance input into the controller in step 307.

In step 309, controller 107 determines the optimal split of battery pack usage based on the distance to travel before recharging and on the calculated power required to reach that distance. The required power depends on the efficiency of the vehicle, provided in step 305, in converting battery power to propulsive power. As such, the required power is based on a number of assumptions, such as vehicle speed, terrain (e.g., uphill, downhill, or relatively flat), vehicle weight (e.g., number of passengers, cargo, etc.), wind effects (e.g., headwind, tailwind) and the temperature since the temperature may affect battery efficiency. Additionally, determining the required power is based on assumptions relating to the use of various auxiliary systems that also require power from the vehicle's batteries (e.g., radio, passenger heating/cooling (HVAC) system, battery heating/cooling, headlights, etc.). These assumptions may be stored in memory or calculated based on detectable criteria (e.g., vehicle weight, temperature, etc.). If the assumptions are preset and stored in memory, the presets may be input by the vehicle's manufacturer, a representative of the manufacturer, a third party service provider, or the user. Regardless of the technique used to determine these assumptions, the assumptions are input into controller 107 at step 311. In addition to the SOC for each of the battery packs (step 303), the vehicle's efficiency (step 305), the intended distance (step 307) and the operational assumptions (step 311), battery pack operational parameters are also input into the controller (step 313) prior to determining battery pack split. Battery pack parameters that may be input in step 313 include capacity, performance versus temperature data, and minimum allowable SOC levels.

As previously noted, the output from step 309 is the calculated split between the battery packs as required to optimize vehicle efficiency (step 315). In the preferred embodiment utilizing non-metal-air and metal-air battery packs, and based on the efficiencies and characteristics of different battery types in accordance with the current state-of-the art, optimization step 309 minimizes use of the metal-air battery pack while ensuring that a minimum SOC level, i.e., a power reserve, is retained within the non-metal-air battery pack at the conclusion of the trip, i.e., immediately prior to battery charging. Accordingly, in a typical embodiment during the initial stages of vehicle use, the non-metal-air battery pack is used exclusively. Then, as the SOC of the non-metal-air battery pack drops, the metal-air battery pack is used to augment the output of the non-metal-air battery pack.

Since the system of the invention is designed to maximize power source efficiency while ensuring that a sufficient power reserve is maintained within the non-metal-air battery pack, in step 317 controller 107 monitors the SOC of the battery packs, comparing those SOC values to the SOC values predicted by controller 107 in step 309 (i.e., predicted use profiles for the two battery packs). If the actual and predicted SOC values are the same, within a preset tolerance (step 319), then power continues to be split in accordance with the original optimization scheme. If, on the other hand, the actual SOC levels do not match up with the predicted levels (step 321), then the data input into controller 107 is updated (step 323) and the controller recalculates the optimal split between the battery packs. At a minimum, during step 323 updated SOC levels are input into controller 107 as well as the remaining distance to travel.

Figure 4:
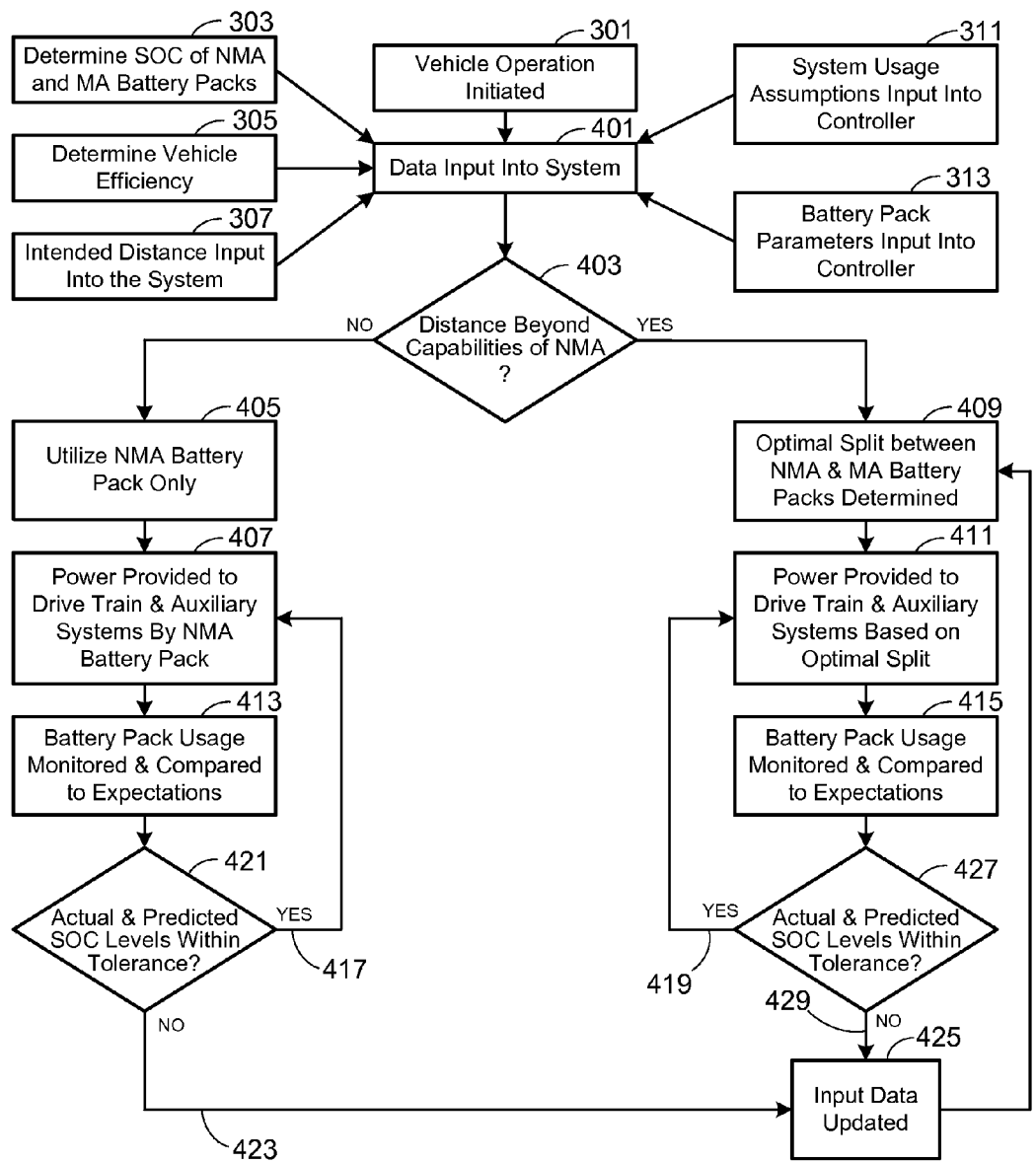
FIG. 4 illustrates a specific embodiment of the methodology of FIG. 3.

As previously noted, the optimal split between the non-metal-air and metal-air battery packs determined in step 309 depends upon the specific chemistry, configuration, and capacity of the battery packs. To further illustrate the invention, FIG. 4 provides a specific embodiment based on the assumptions (i) that the non-metal-air battery pack has sufficient capacity, when fully charged, to meet the normal driving requirements of the vehicle; (ii) the non-metal-air battery pack is more energy efficient than the metal-air battery pack; and (iii) the metal-air battery pack is more susceptible to performance degradation due to repeated charge/discharge cycling than the non-metal-air battery pack.

As shown in FIG. 4, after vehicle operation is initiated (step 301), the various operational parameters are input into the system (step 401) including SOC for each of the battery packs (step 303), vehicle efficiency (step 305), travel distance (step 307), system usage assumptions (step 311) and battery pack parameters (step 313). Controller 107 then determines whether or not the non-metal-air battery pack has sufficient charge to meet the driving requirements placed on the system, including the expected travel distance, while retaining sufficient back-up reserve SOC (step 403). If it does, then only the non-metal-air battery pack is used (steps 405 and 407). If the non-metal-air battery pack does not have sufficient charge to meet the driving requirements, then controller 107 determines an optimal split between the two battery packs based on the driving requirements (step 409) and provides power to the vehicle systems based on that optimal split (step 411). In steps 413 and 415, controller 107 monitors the SOC of the battery packs and compares those SOC values to the SOC values predicted by controller 107. If the actual and predicted SOC values are the same within a preset tolerance (steps 417 and 419), then power continues to be split in accordance with the original optimization scheme (i.e., steps 405 or 409). If during step 421 controller 107 determines that extra power is required beyond the capabilities of the non-metal-air battery pack (step 423), for example due to the system drain on the non-metal-air battery pack being greater than expected (e.g., because of unexpected headwinds, excess cargo weight, etc.), then the operating conditions are updated (step 425) and controller 107 determines an optimal split between the battery packs. Similarly, if during step 427 the actual SOC levels do not match up with the predicted levels (step 429), then the data input into controller 107 is updated (step 425) and the controller recalculates the optimal split between the battery packs.

While the process illustrated in FIG. 3 can be used to provide the optimal split between the two battery packs comprising the vehicle's power source, further optimization may be achieved by allowing controller 107 to define or set the optimal vehicle speed and/or vehicle acceleration since vehicle efficiency is a function of vehicle speed and acceleration.

Figure 5:
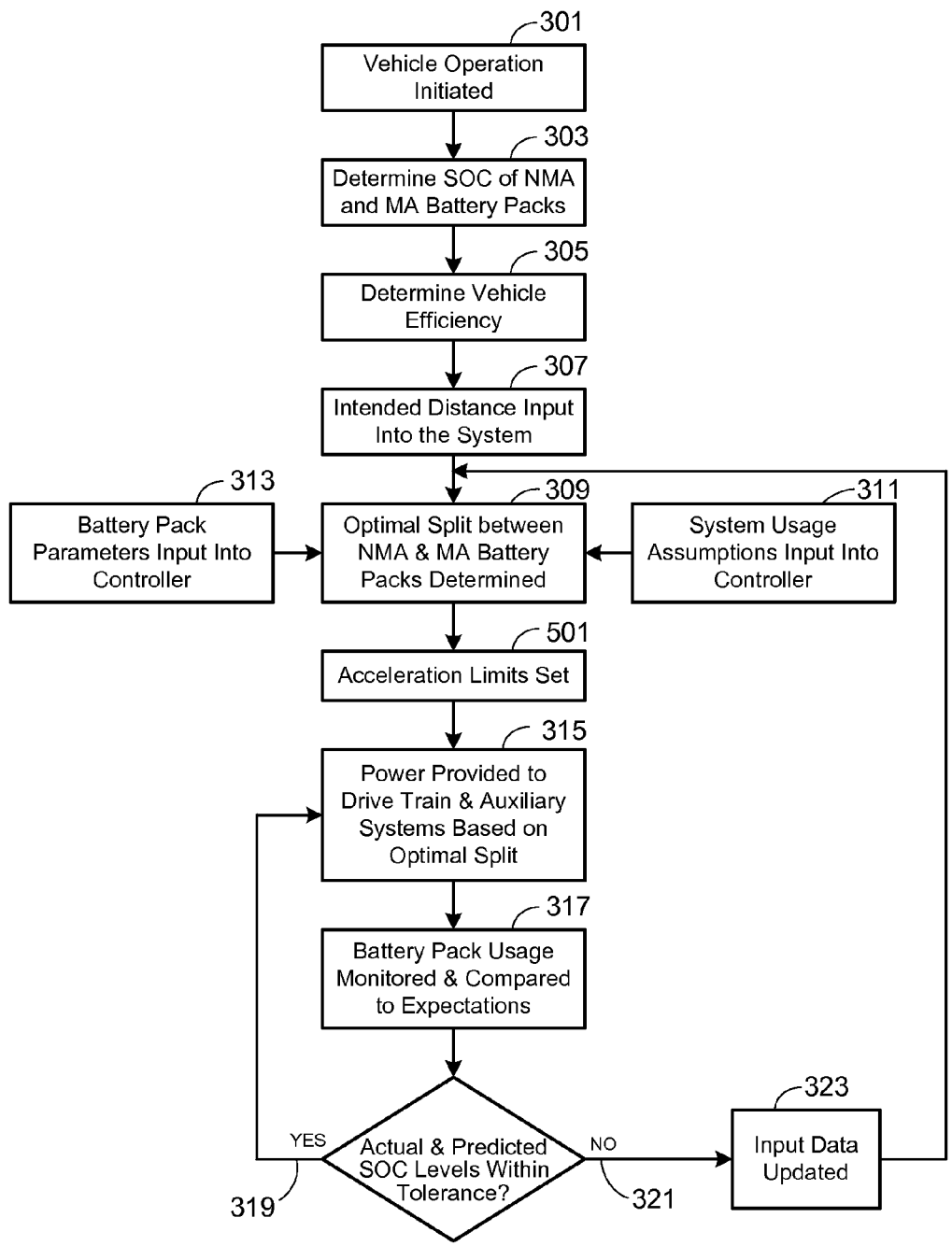
FIG. 5 illustrates a modification of the methodology of FIG. 3, wherein the controller sets acceleration limits during the battery pack optimization routine.
Figure 6:
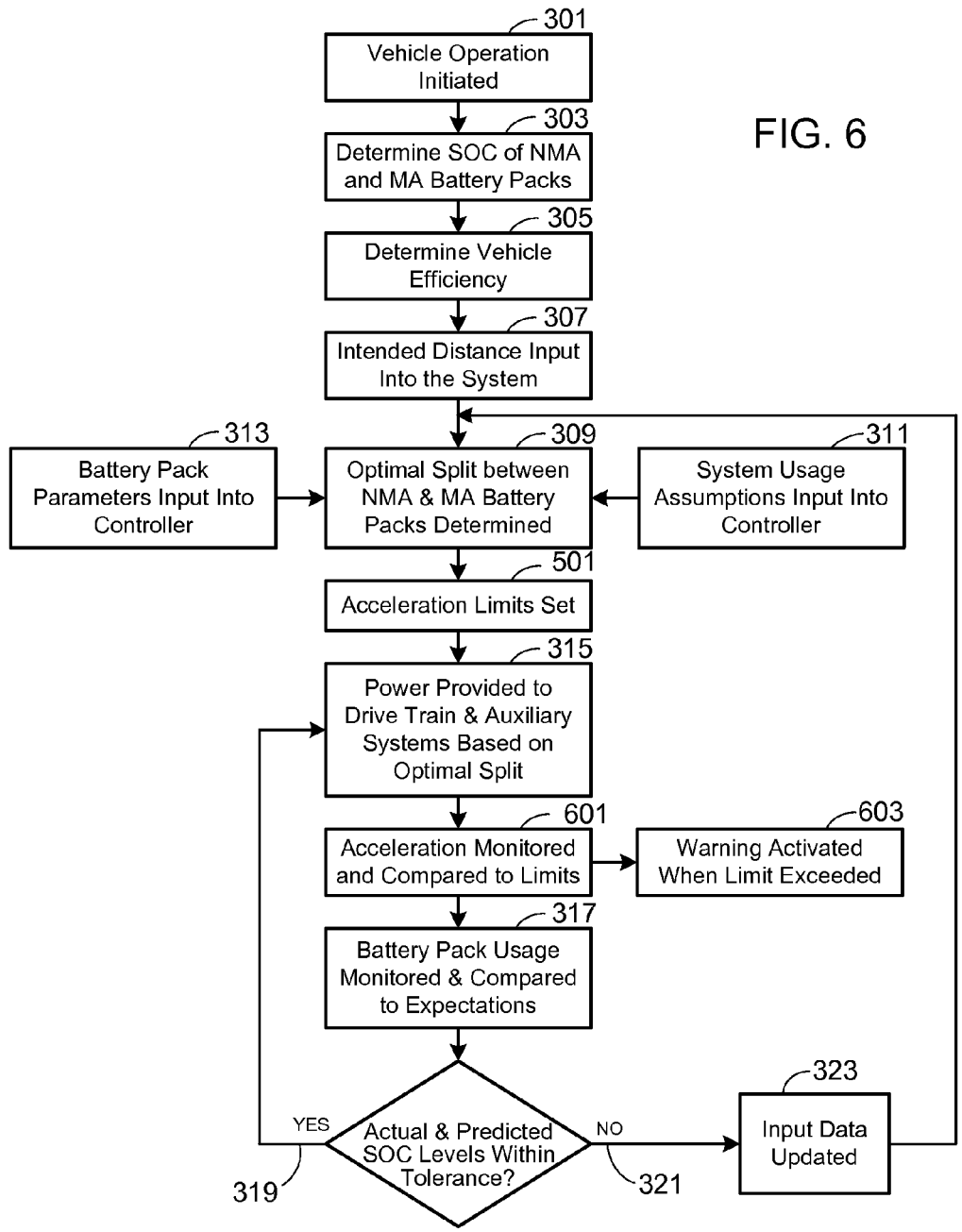
FIG. 6 illustrates a modification of the methodology of FIG. 5, wherein the controller activates a warning when the acceleration limit is reached/exceeded.

FIG. 5 illustrates a process based on the methodology of FIG. 3. As shown, in addition to setting the optimal split between the non-metal-air and metal-air battery packs (step 309), controller 107 also sets acceleration limits (step 501). In at least one embodiment, the acceleration limit is set as a motor torque limit. In one embodiment, acceleration limits are preset and applied whenever the optimization system is used. In an alternate embodiment, when the power source optimization system is used the user may choose whether or not to allow acceleration limits to be set by the controller. In yet another embodiment, the controller sets soft acceleration limits during power source optimization. As used herein, a soft limitation refers to a limitation that is advisory in nature and therefore allows the user to easily override the limitation. For example, when controller 107 sets a soft acceleration limit, the system can be configured to send a warning to the driver whenever the driver is approaching the acceleration limit or whenever the acceleration limit is exceeded. Warnings may be in the form of a warning light (e.g., in the instrument cluster or the user interface), an audible warning (e.g., an audible alarm or a pre-recorded vocal message), or a physical response (e.g., increasing accelerator pedal resistance). FIG. 6 illustrates a system utilizing soft acceleration limits, this process including the steps of monitoring the acceleration and comparing it to the preset limits (step 601), and activating a warning such as those described above when the limit is exceeded (step 603).

The acceleration limits applied in the process illustrated in FIG. 5 may be constant, i.e., applied equally regardless of the current vehicle speed or the SOC of one or both battery packs. Alternately, the acceleration limits may be based on the remaining SOC of one or both battery packs, for example applying more restrictive acceleration limits as the remaining SOC decreases, thereby conserving more battery pack power. Alternately, the acceleration limits may be based on the current vehicle speed, for example applying more restrictive acceleration limits as the vehicle speed increases. Alternately, the acceleration limits may be tied to some other vehicle operating parameter such as motor torque.

As previously noted, in addition to optimizing the split between the two battery packs comprising the vehicle's power source, further optimization may be achieved by allowing controller 107 to set the optimal vehicle speed, or at least to set maximum vehicle speeds, since vehicle efficiency is a function of vehicle speed and, in general, decreases as vehicle speed increases.

Figure 7:
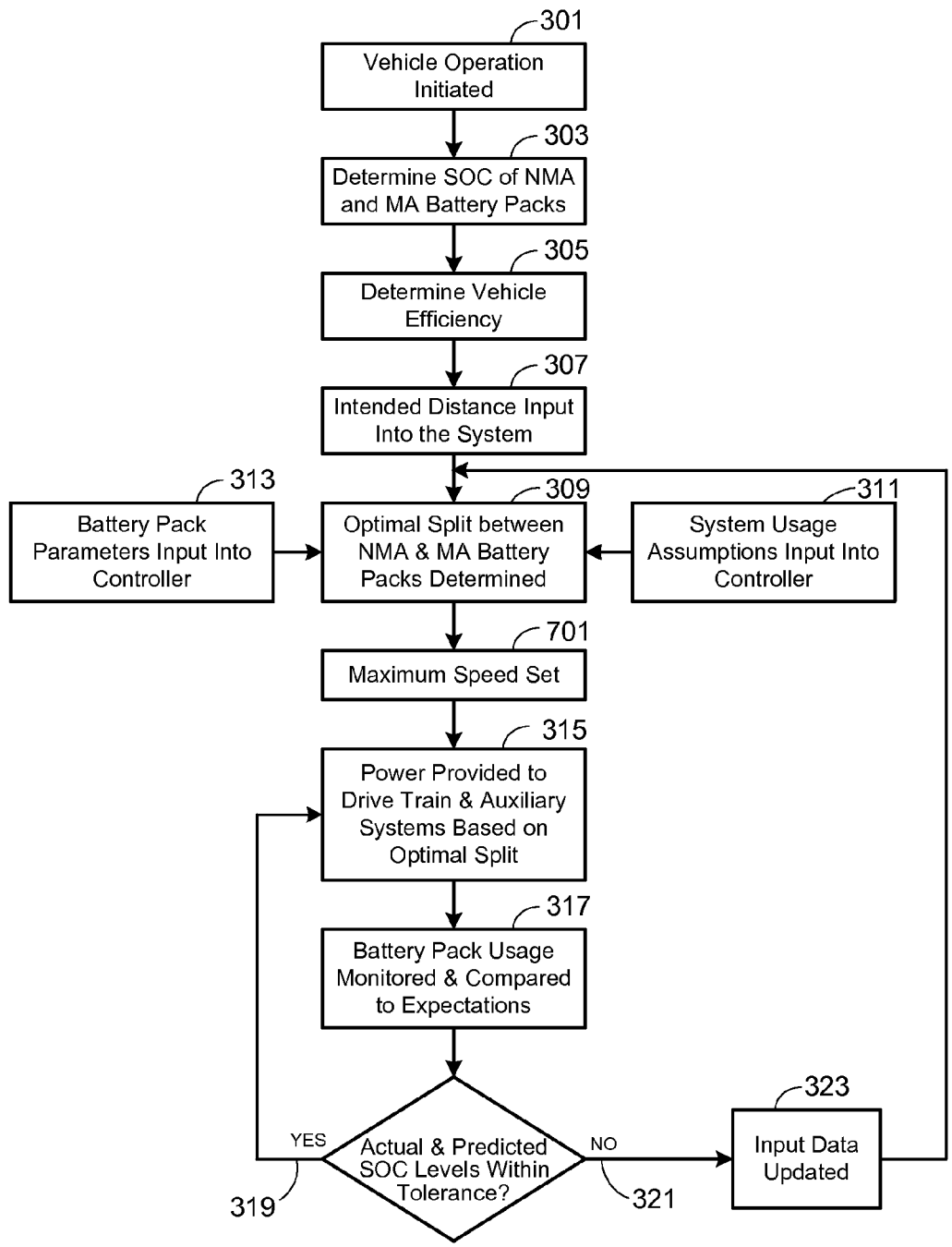
FIG. 7 illustrates a modification of the methodology of FIG. 3, wherein the controller sets maximum speeds during the battery pack optimization routine.

FIG. 7 illustrates a process based on the methodology of FIG. 3. As shown, in addition to setting the optimal split between the non-metal-air and metal-air battery packs (step 309), controller 107 also sets a maximum speed (step 701). In its simplest configuration, the system sets the legal speed limit, or a percentage thereof (e.g., 95% of the legal speed limit), as the maximum speed in step 701. In alternate configurations, and as described more fully below, the maximum speed set by the system varies depending upon the vehicle's current location.

Figure 8:
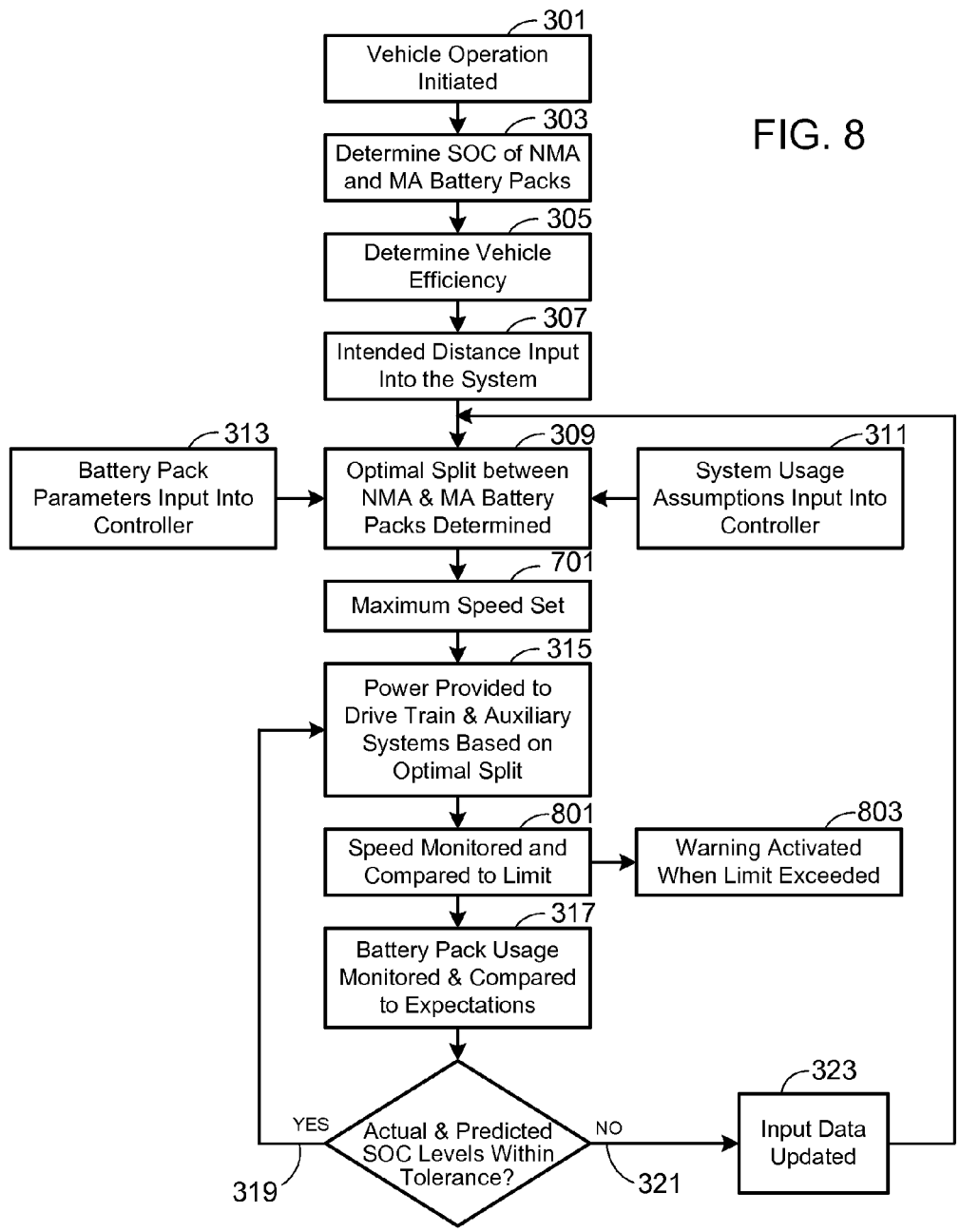
FIG. 8 illustrates a modification of the methodology of FIG. 7, wherein the controller activates a warning when the maximum speed is reached/exceeded.

In one embodiment, the speed limit is preset and applied whenever the optimization system is used. In an alternate embodiment, when the power source optimization system is used the user may choose whether or not to allow the controller to set a speed limit. In yet another embodiment, the controller sets a soft speed limit during power source optimization, thus allowing the user to easily override the limitation if desired. For example, when controller 107 sets a soft speed limit, the system can be configured to send a warning to the driver whenever the driver is approaching the speed limit or whenever the speed limit is exceeded. Warnings may be in the form of a warning light (e.g., in the instrument cluster or the user interface), an audible warning (e.g., an audible alarm or a pre-recorded vocal message), or a physical response (e.g., increasing accelerator pedal resistance). FIG. 8 illustrates a system utilizing soft speed limits, this process including the steps of monitoring the speed of the vehicle and comparing it to the preset limit (step 801), and activating a warning such as those described above when the limit is exceeded (step 803).

Preferably the speed limit set by controller 107 is constant. Alternately, the speed limit may be based on the remaining SOC of one or both battery packs, for example applying a more restrictive speed limit as the remaining SOC decreases, thereby conserving more battery pack power.

Figure 9:
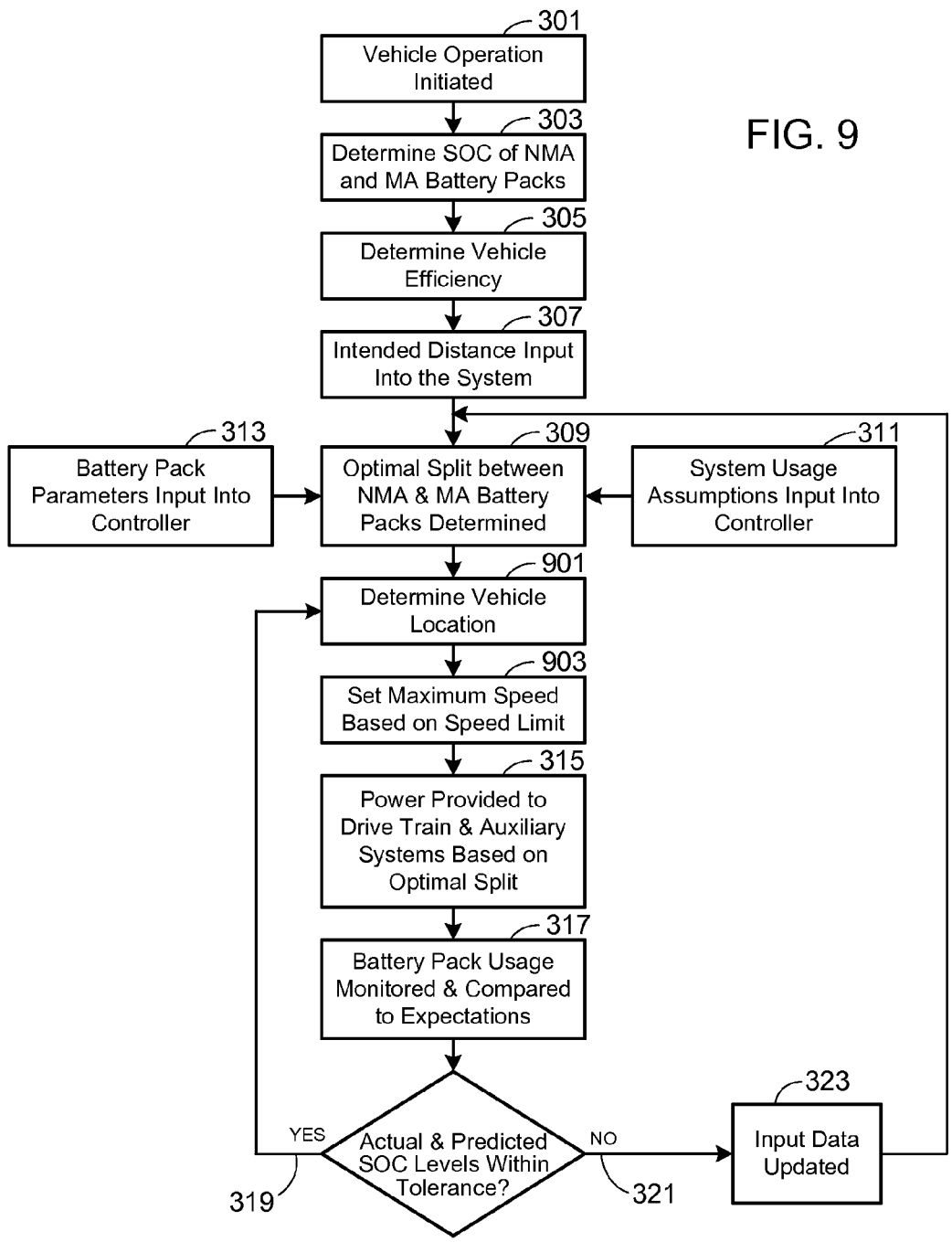
FIG. 9 illustrates a modification of the methodology of FIG. 3, wherein during the battery pack optimization routine the controller sets maximum speeds based on the speed limit corresponding to the vehicle's location.

In an alternate configuration, illustrated in FIG. 9, in addition to optimizing the power split between battery packs, controller 107 monitors vehicle position (step 901) and sets a maximum speed (step 903) based on the vehicle's location and the speed limit for that location. Vehicle position is determined using an on-board global positioning system (GPS), either a stand-alone subsystem or the GPS that corresponds to the vehicle's navigation system. Preferably the GPS includes a data base of speed limit as a function of location. Alternately, the speed limit may be derived from the type of road, e.g., interstate highways, city roads, etc.

The speed limit set in step 903 may be based on a percentage of the legal speed limit for the vehicle's current location, e.g., 95% of the speed limit. Alternately, controller 107 may set the speed limit based on the vehicle's current location and the vehicle's efficiency data given as a function of speed. For example, in this configuration controller 107 may set the maximum speed to be equal to the speed limit at vehicle speeds of 20 mph or less; 98% of the legal speed limit at vehicle speeds of 20-40 mph; 95% of the legal speed limit at vehicle speeds of 40-55 mph; and 92% of the legal speed limit at vehicle speeds greater than 55 mph.

Figure 10:
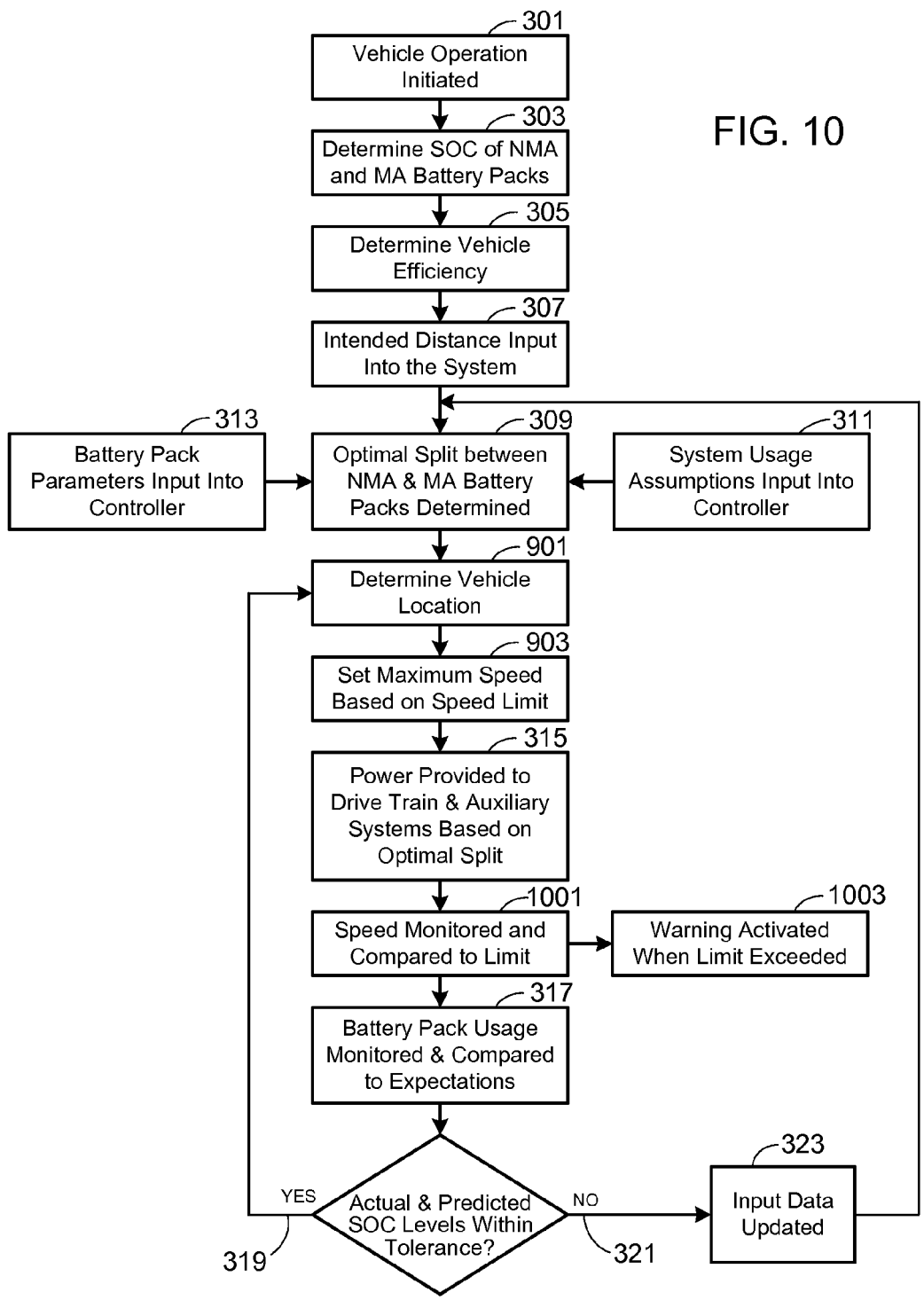
FIG. 10 illustrates a modification of the methodology of FIG. 9, wherein the controller activates a warning when the maximum speed is reached/exceeded.

As in the prior embodiments, when the present system is used to optimize both battery pack usage and set maximum speeds based on the speed limit for the vehicle's location, the process can either utilize hard maximum speed limits (e.g., FIG. 9), or soft maximum speed limits (e.g., FIG. 10) in which the vehicle speed is compared to the preset limit (step 1001) and a warning is activated when the limit is exceeded (step 1003).

Figure 11:
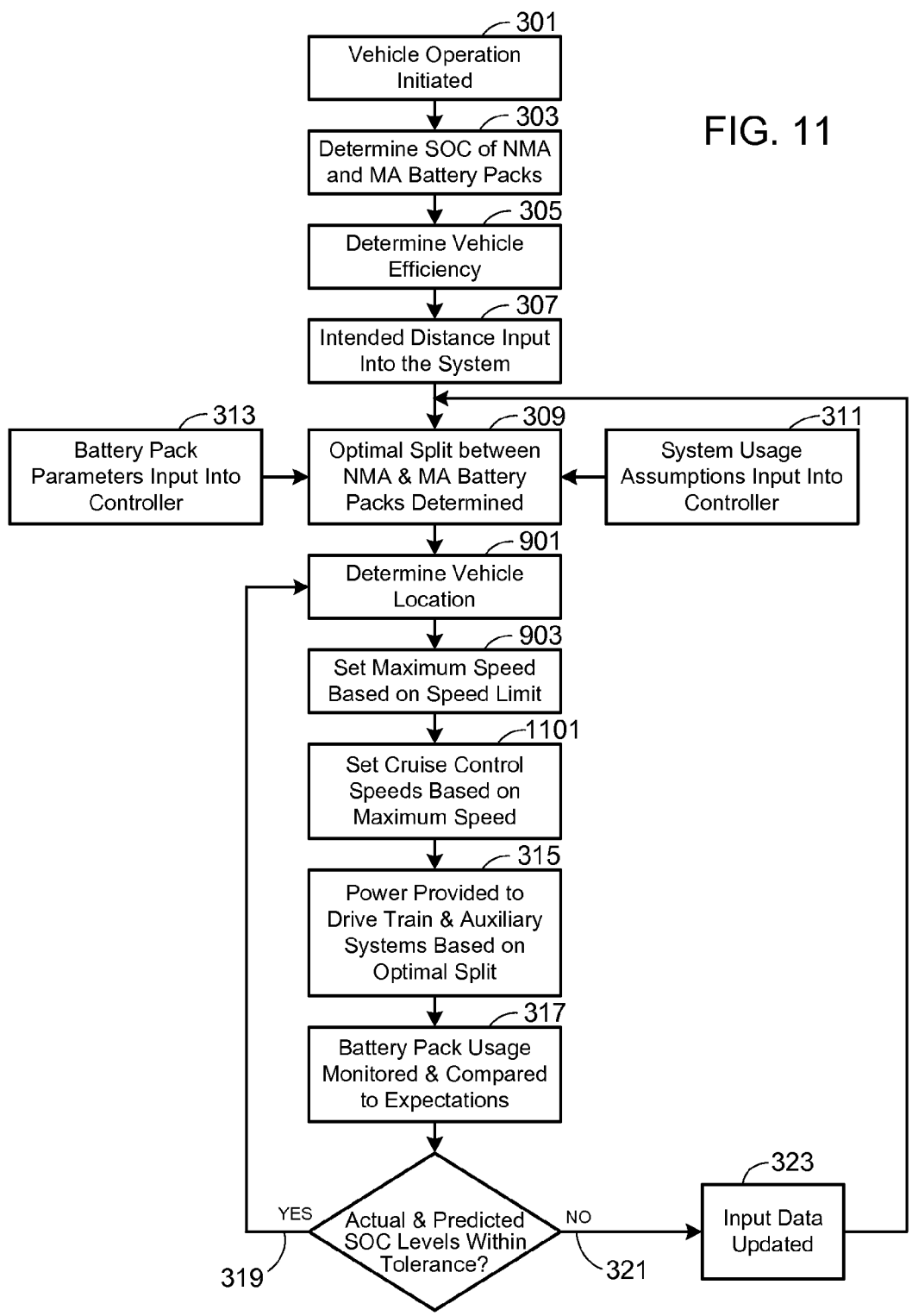
FIG. 11 illustrates a modification of the methodology of FIG. 9, wherein the maximum speeds set by the controller are utilized by the cruise control system.

In an alternate configuration, illustrated in FIG. 11, in addition to determining the vehicle's location (step 901) and setting the maximum speed based on the speed limit for the vehicle's location (step 903), the vehicle's cruise control utilizes the speed set by the controller (step 1101) to aid the driver in achieving optimal efficiency. As such, whenever the user activates the cruise control, the speed is held to the maximum speeds set by controller 107 in step 903. As with the process described above relative to FIGS. 9 and 10, the speed limit set in step 903 is preferably a percentage of the legal speed limit for the vehicle's current location, as provided by an on-board GPS system. It will be appreciated that the driver may override the cruise control whenever desired, either exceeding the maximum speeds set in the cruise control system, or slowing down as the driver deems necessary.

Figure 12:
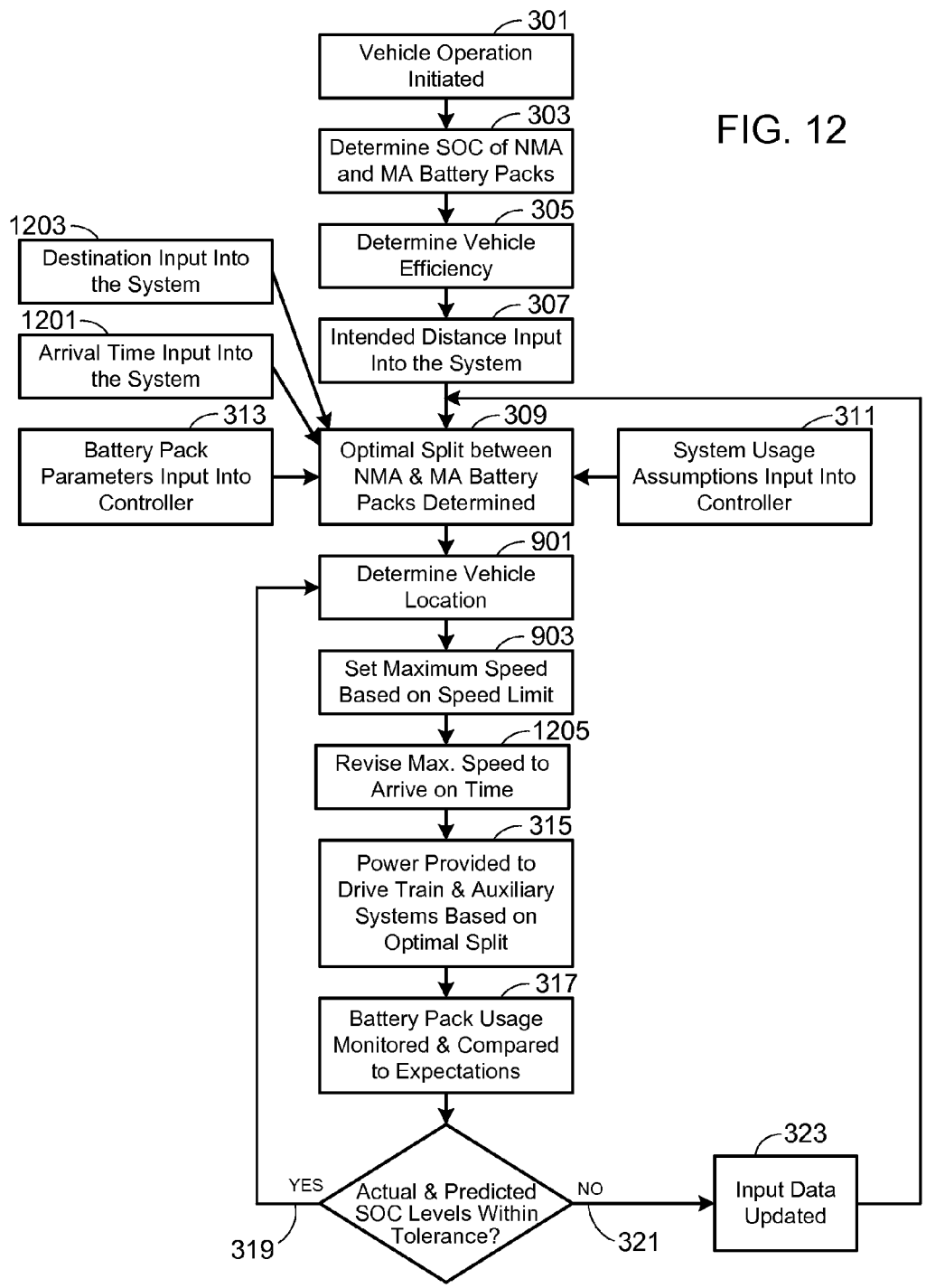
FIG. 12 illustrates a modification of the methodology of FIG. 9, wherein the controller overrides the maximum speeds set by the controller to ensure that the vehicle arrives at a predefined destination at a predefined arrival time.

In the systems described above relative to FIGS. 7-11, the maximum speed is set based on preset maximums or based on a percentage of the legal speed limit, e.g., the speed limit for the vehicle's current location. In an alternate configuration, illustrated in FIG. 12, controller 107 sets speeds based both on the legal speed limit for the vehicle's present location, and on input provided by the user as to when the user must arrive at a predetermined location (step 1201). In addition to inputting the required arrival time, the user also inputs the destination (step 1203). The destination input in step 1203 may be the same as, or different from, the distance information input in step 307. Regardless of whether the two distances are the same or different, in step 315 controller 107 determines the optimal split between the non-metal-air and metal-air battery packs to assure that the vehicle can travel the distance input in step 307 while retaining the desired reserves within the non-metal-air battery pack at the conclusion of the trip, i.e., immediately prior to battery charging. As in prior embodiments, controller 107 sets the speed in step 903 to optimize efficiency while still traveling at an adequate speed to be safe. As such, typically the maximum speed set in step 903 is a percentage of the legal speed limit for the vehicle's present location (e.g., 90 or 95% of the legal speed limit). Additionally, in this configuration during step 1205 controller 107 overrides the speed set in step 903 in order to ensure that the vehicle arrives at the destination input in step 1203 by the arrival time input in step 1201. Once the destination input in step 1203 has been reached, and assuming further travel is required prior to recharging, the maximum speed defaults back to that set in step 903.

Figure 13:
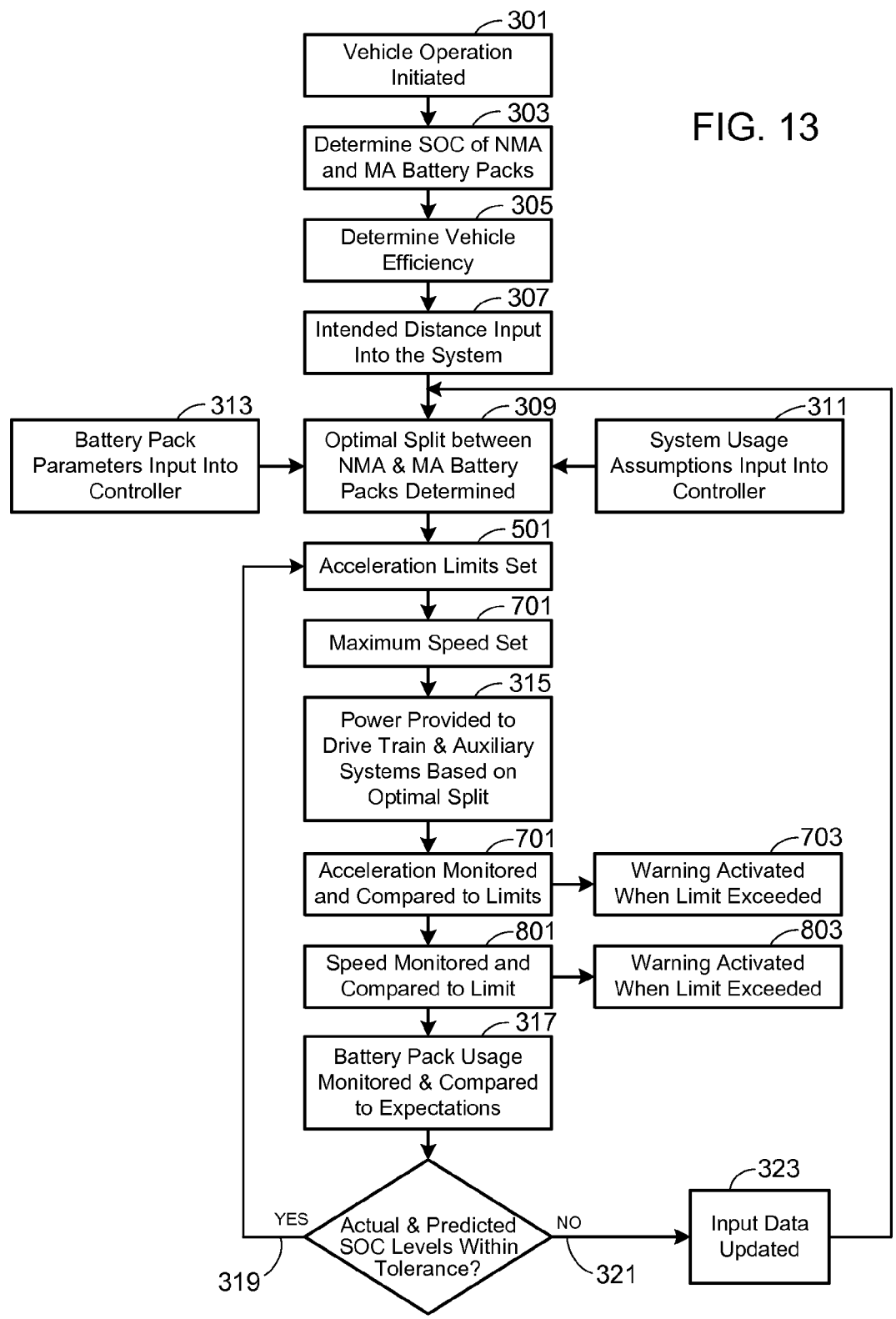
FIG. 13 illustrates a methodology combining the attributes of the processes illustrated in FIGS. 6 and 8.

It will be appreciated that controller 107 may set the acceleration, for example as illustrated in FIGS. 5 and 6, as well as the maximum speeds, for example as illustrated in FIGS. 7-12. An exemplary system combining the acceleration optimizing configuration illustrated in FIG. 6 and the speed optimizing configuration illustrated in FIG. 8 is shown in FIG. 13. It will be appreciated that inventors envision other combinations of other embodiments, e.g., combining the configurations of FIGS. 5 and 7; combining the configurations of FIGS. 6 and 9; combining the configurations of FIGS. 6 and 10; combining the configurations of FIGS. 6 and 11; combining the configurations of FIGS. 6 and 12; etc.

As previously noted, the present invention optimizes the power source of an electric vehicle comprised of two different types of batteries based on the requirements placed on the power source by the vehicle and its driver. As such, the optimization system requires various input relating to the capabilities and conditions corresponding to the battery pack, the efficiency of the vehicle in converting the output from the power source to miles traveled, the ambient environment, and the driver's expectations regarding future travel plans. While much of this was described above, further details are provided below.

Vehicle Efficiency—As noted above, the ability of the present invention to optimize use of the vehicle's dual battery packs depends, in part, on the accuracy of the efficiency data input into the system controller in step 305. The efficiency data input into the optimization process may be based on the average conversion efficiency for the particular make and model of the vehicle; more preferably the efficiency input in step 305 may be based on the average conversion efficiency for the particular vehicle undergoing power source optimization; and still more preferably the efficiency input in step 305 may be based on the conversion efficiency data for the particular vehicle undergoing power source optimization during a relatively recent period of time (e.g., for the last month or week; for the last 100 miles or 50 miles the vehicle was driven; etc.). In at least one embodiment, efficiency data is recorded and stored within the vehicle system memory (e.g., memory corresponding to controller 107) for each individual driver. Then, during step 305, the current driver's identification is either input or determined by the controller. The driver's identification may be input using a touch-screen, via the navigation system interface, or via some other vehicle user interface. Alternately, the driver's identification may be determined by controller 107 using data received from the driver's key-fob or similar device. Using efficiency data in step 305 that is specific to a particular driver allows the optimization system to take into account a particular user's driving habits (e.g., acceleration from stops; acceleration/deceleration versus steady speed driving; top speeds; etc.), thus making the optimization process more accurate.

Distance—As noted above, the ability of the present invention to optimize use of the vehicle's dual battery packs depends, in part, on the accuracy of the distance information input into the controller in step 307 as this distance information allows the controller to optimize battery pack usage while ensuring that sufficient reserve power is maintained. Accordingly, rough estimates of expected travel distance, such as when the user inputs a 'best guess' as to travel distance, provide the least accuracy in power source optimization. Similarly, if the system utilizes a system preset distance, optimization will typically be hampered. System preset distances may be input by the vehicle's manufacturer or representative, a third party service provider, or, as preferred, the user. Preferably the user inputs as a preset distance the typical driving distance between charge cycles, e.g., the distance traveled to/from work on a daily basis. In this case, using a preset distance simplifies the optimization process by allowing the user to use a preset based on a 'typical' driving pattern. In at least one preferred embodiment, the distance input during step 307 is input by the user via interaction with the vehicle's navigation system, rather than a separate interface. For example, the user can input a travel destination and indicate that a round trip to the travel destination will be required prior to battery charging. Alternately, the user may input an entire travel itinerary into the navigation system, the travel itinerary including multiple travel destinations for the next driving cycle. In at least one embodiment of the invention, if the user does not input a specific travel distance, the system defaults to using historical data. For example, the system may be configured to average the travel distance between charge cycles for a predefined number of cycles. In at least one embodiment of the invention, if user identification is input into the system, either directly or indirectly, the system defaults to either preset travel distance or historical data for that particular driver.

In at least one preferred embodiment, if controller 107 has access to specific route information, for example due to the user inputting a specific destination or travel itinerary into the vehicle's navigation system during step 307, then the vehicle efficiency data input in step 305 is fine tuned. Specifically, in this instance the vehicle efficiency data may be adjusted to take into account expected travel speeds and expected elevation changes, both of which may affect vehicle efficiency.

Operational Details—In steps 311 and 313, various operational details may be input into, or derived by, the system, these details further improving on the accuracy of the vehicle efficiency, and thus the optimization process of the invention. First, the operating parameters of each of the battery packs may be monitored, thus allowing the controller to adjust power source operation to further optimize battery pack usage. Exemplary battery pack parameters that may be monitored include the temperature of each of the battery packs (e.g., cell temperatures within each pack; coolant temperatures; etc.), current discharged from each battery pack, and operational parameters specific to the metal-air cells (e.g., oxygen concentration, humidity, air flow temperature, rate, etc.). Second, by monitoring ambient temperature, the controller can adjust the vehicle efficiency based on the expected cooling or heating required by the battery packs. Additionally, controller 107 can estimate the likely use of the vehicle's HVAC system based on the ambient temperature, HVAC use clearly tied to battery drain and thus vehicle efficiency. Third, by monitoring vehicle weight, or requesting passenger/cargo information from the driver, controller 107 is able to estimate effects of vehicle weight on vehicle efficiency (e.g., more passengers and/or cargo equates to a heavier vehicle which can decrease vehicle efficiency). Fourth, by monitoring vehicle elevation or estimating elevation based on the travel itinerary input into the vehicle's navigation system, vehicle efficiency can be adjusted (e.g., driving uphill requires more energy, and is therefore less efficient, than driving downhill). Fifth, by monitoring ambient lighting controller 107 can determine whether or not driving lights are required and adjust vehicle efficiency accordingly (e.g., driving at night requires more energy, and is therefore less efficient, due to the use of driving lights). Sixth, by monitoring traffic conditions, for example using the vehicle's GPS system, controller 107 can adjust the vehicle's efficiency to take into account traffic conditions (e.g., slow traffic requires more time to reach a given destination, thus decreasing vehicle efficiency). Seventh, by determining the driver (via direct input or utilizing a driver identification system such as a keyfob that remotely identifies the user), auxiliary system use (e.g., vehicle entertainment system, lighting, etc.) for the particular user can be used to adjust the vehicle's efficiency to take into account expected auxiliary system loads. Eighth, by monitoring weather conditions, for example using the vehicle's navigation system or broadcast weather alerts, controller 107 can adjust the vehicle's efficiency to take into account changing weather conditions that may impact vehicle efficiency (e.g., heavy rains, snow, heavy winds, etc.).

It will be appreciated that while the illustrated embodiments are preferred, a variety of variations are envisioned that are clearly within the scope of the invention. For example, and as previously noted, much of the description and illustrated embodiments are based on the assumption that the non-metal-air battery pack is more energy efficiency and has a better cycle life than the metal-air battery pack. While that is typically true utilizing current battery chemistries and configurations, the advantages and disadvantage of non-metal-air and metal-air batteries may be reversed in the future, leading to preferred embodiments of the invention optimizing the power source by minimizing use of the non-metal-air battery pack.

Additionally, while both the metal-air battery pack 101 and the non-metal-air battery pack 103 are shown and described as singular packs, it should be understood that one or both of these packs may be comprised of multiple modules, and that the present invention is equally applicable to such a configuration. The use of multiple modules (or mini-battery packs) may be useful in distributing weight throughout EV 100, or to fit into the physical constraints of the EV's chassis/body, and does not impact the present invention.

As will be understood by those familiar with the art, the present invention may be embodied in other specific forms without departing from the spirit or essential characteristics thereof. For example, while the illustrated embodiments assume the use of a non-metal-air battery pack as the first battery pack and a metal-air battery pack as the second battery pack, these battery types may be reversed, thus using the metal-air battery pack as the first battery pack and the non-metal-air battery pack as the second battery pack. Accordingly, the disclosures and descriptions herein are intended to be illustrative, but not limiting, of the scope of the invention which is set forth in the following claims.

What is claimed is:

1. A method of optimizing a power source utilized by an electric vehicle, the power source including at least a first battery pack and a second battery pack, wherein the first and second battery packs are comprised of different battery types, the method comprising the steps of:
   a) determining a first state-of-charge (SOC) of the first battery pack and a second SOC of the second battery pack;
   b) determining a vehicle efficiency, wherein said vehicle efficiency corresponds to an estimated efficiency for converting an output from said power source to miles traveled;
   c) obtaining a travel distance, wherein said travel distance corresponds to an expected distance to travel before a subsequent charging cycle;
   d) determining an optimal split between said first and second battery packs based on said vehicle efficiency and said first and second SOCs, wherein said step of determining said optimal split further comprises the step of minimizing use of said second battery pack while still providing the electric vehicle with sufficient power to traverse said travel distance;
   e) providing power to said electric vehicle from said power source in accordance with said optimal split;
   f) monitoring a first battery pack current SOC and a second battery pack current SOC;
   g) comparing said first battery pack current SOC to a first battery pack predicted use profile and said second battery pack current SOC to a second battery pack predicted use profile;
   h) determining a revised optimal split between said first and second battery packs to reach said travel distance if said first battery pack current SOC does not match said first battery pack predicted use profile within a first preset tolerance or said second battery pack current SOC does not match said second battery pack predicted use profile within a second preset tolerance, wherein said step of determining said revised optimal split further comprises the step of updating said vehicle efficiency and said travel distance; and
   i) providing power to said electric vehicle from said power source in accordance with said revised optimal split.

2. The method of claim 1, wherein said first battery pack is comprised of a plurality of non-metal-air cells and said second battery pack is comprised of a plurality of metal-air cells.

3. The method of claim 1, wherein said step of determining said optimal split further comprises the step of maintaining a minimum SOC within said first battery pack.

4. The method of claim 1, wherein said step of determining said optimal split further comprises the step of maximizing power source efficiency.

5. The method of claim 1, wherein prior to performing step h), said method further comprises the steps of monitoring traffic conditions and adjusting said vehicle efficiency based on said traffic conditions.

6. The method of claim 1, further comprising the step of determining first battery pack operational parameters and second battery pack operational parameters prior to performing step d).

7. The method of claim 1, wherein said vehicle efficiency is defined as an average conversion efficiency for said electric vehicle.

8. The method of claim 1, wherein said vehicle efficiency is given as a function of vehicle speed and vehicle acceleration.

9. The method of claim 1, wherein said vehicle efficiency corresponds to a particular driver, wherein said particular driver is currently operating said electric vehicle.

10. The method of claim 1, wherein said travel distance corresponds to a preset distance, said preset distance corresponding to an average distance traveled between charge cycles for said electric vehicle.

11. The method of claim 1, wherein said step of obtaining said travel distance further comprises the step of determining said travel distance from a destination input into a navigation system corresponding to said electric vehicle.

12. The method of claim 1, wherein said step of obtaining said travel distance further comprises the step of determining said travel distance from a travel itinerary input into a navigation system corresponding to said electric vehicle.

13. The method of claim 12, wherein prior to performing step d), said method further comprises the steps of estimating variations in vehicle elevation expected by said travel itinerary and adjusting said vehicle efficiency based on said variations in vehicle elevation.

14. The method of claim 12, wherein prior to performing step d), said method further comprises the steps of estimating traffic conditions expected by said travel itinerary and adjusting said vehicle efficiency based on said traffic conditions.

15. The method of claim 1, wherein said step of obtaining said travel distance further comprises the step of inputting said travel distance into a user interface corresponding to said electric vehicle.

16. The method of claim 1, wherein prior to performing step d), said method further comprises the steps of determining ambient temperature, estimating first and second battery pack cooling demands based on said ambient temperature, and adjusting said vehicle efficiency based on said first and second battery pack cooling demands.

17. The method of claim 1, wherein prior to performing step d), said method further comprises the steps of estimating vehicle weight and adjusting said vehicle efficiency based on said vehicle weight.

18. The method of claim 1, wherein prior to performing step d), said method further comprises the steps of determining ambient lighting conditions, estimating driving light requirements based on said ambient lighting conditions, estimating first and second battery pack loading to meet said driving light requirements, and adjusting said vehicle efficiency based on said first and second battery pack loading.

19. The method of claim 1, wherein prior to performing step d), said method further comprises the steps of determining weather conditions and adjusting said vehicle efficiency based on said weather conditions.

20. The method of claim 1, wherein prior to performing step d), said method further comprises the steps of identifying a driver for said electric vehicle, estimating auxiliary battery pack loading corresponding to said driver based on prior use of said electric vehicle by said driver, and adjusting said vehicle efficiency based on said estimated auxiliary battery pack loading.

21. A method of optimizing a power source utilized by an electric vehicle, the power source including at least a first battery pack and a second battery pack, wherein the first and second battery packs are comprised of different battery types, the method comprising the steps of:
 a) determining a first state-of-charge (SOC) of the first battery pack and a second SOC of the second battery pack;
 b) determining a vehicle efficiency, wherein said vehicle efficiency corresponds to an estimated efficiency for converting an output from said power source to miles traveled;
 c) obtaining a travel distance, wherein said travel distance corresponds to an expected distance to travel before a subsequent charging cycle;
 d) determining an optimal split between said first and second battery packs based on said vehicle efficiency and said first and second SOCs, wherein said step of determining said optimal split further comprises the step of minimizing use of said second battery pack while still providing the electric vehicle with sufficient power to traverse said travel distance;
 e) providing power to said electric vehicle from said power source in accordance with said optimal split;
 f) monitoring a first battery pack current SOC and a second battery pack current SOC;
 g) determining a first battery pack remaining SOC and a second battery pack remaining SOC;
 h) comparing said first battery pack remaining SOC to a first battery pack predicted use profile and said second battery pack remaining SOC to a second battery pack predicted use profile;
 i) determining a revised optimal split between said first and second battery packs to reach said travel distance if said first battery pack remaining SOC does not match said first battery pack predicted use profile within a first preset tolerance or said second battery pack remaining SOC does not match said second battery pack predicted use profile within a second preset tolerance, wherein said step of determining said revised optimal split further comprises the step of updating said vehicle efficiency and said travel distance; and
 j) providing power to said electric vehicle from said power source in accordance with said revised optimal split.

22. The method of claim 21, wherein prior to performing step i), said method further comprises the steps of monitoring traffic conditions and adjusting said vehicle efficiency based on said traffic conditions.

23. The method of claim 21, wherein said first battery pack is comprised of a plurality of non-metal-air cells and said second battery pack is comprised of a plurality of metal-air cells.

24. The method of claim 21, wherein said step of determining said optimal split further comprises the step of maintaining a minimum SOC within said first battery pack.

25. The method of claim 21, wherein said step of determining said optimal split further comprises the step of maximizing power source efficiency.

26. The method of claim 21, further comprising the step of determining first battery pack operational parameters and second battery pack operational parameters prior to performing step d).

27. The method of claim 21, wherein said vehicle efficiency is defined as an average conversion efficiency for said electric vehicle.

28. The method of claim 21, wherein said vehicle efficiency is given as a function of vehicle speed and vehicle acceleration.

29. The method of claim 21, wherein said vehicle efficiency corresponds to a particular driver, wherein said particular driver is currently operating said electric vehicle.

30. The method of claim 21, wherein said travel distance corresponds to a preset distance, said preset distance corresponding to an average distance traveled between charge cycles for said electric vehicle.

31. The method of claim 21, wherein said step of obtaining said travel distance further comprises the step of determining said travel distance from a destination input into a navigation system corresponding to said electric vehicle.

32. The method of claim 21, wherein said step of obtaining said travel distance further comprises the step of determining said travel distance from a travel itinerary input into a navigation system corresponding to said electric vehicle.

33. The method of claim 32, wherein prior to performing step d), said method further comprises the steps of estimating variations in vehicle elevation expected by said travel itinerary and adjusting said vehicle efficiency based on said variations in vehicle elevation.

34. The method of claim 32, wherein prior to performing step d), said method further comprises the steps of estimating traffic conditions expected by said travel itinerary and adjusting said vehicle efficiency based on said traffic conditions.

35. The method of claim 21, wherein said step of obtaining said travel distance further comprises the step of inputting said travel distance into a user interface corresponding to said electric vehicle.

36. The method of claim 21, wherein prior to performing step d), said method further comprises the steps of determining ambient temperature, estimating first and second battery pack cooling demands based on said ambient temperature, and adjusting said vehicle efficiency based on said first and second battery pack cooling demands.

37. The method of claim 21, wherein prior to performing step d), said method further comprises the steps of estimating vehicle weight and adjusting said vehicle efficiency based on said vehicle weight.

38. The method of claim 21, wherein prior to performing step d), said method further comprises the steps of determining ambient lighting conditions, estimating driving light requirements based on said ambient lighting conditions, estimating first and second battery pack loading to meet said driving light requirements, and adjusting said vehicle efficiency based on said first and second battery pack loading.

39. The method of claim 21, wherein prior to performing step d), said method further comprises the steps of determining weather conditions and adjusting said vehicle efficiency based on said weather conditions.

40. The method of claim 21, wherein prior to performing step d), said method further comprises the steps of identifying a driver for said electric vehicle, estimating auxiliary battery pack loading corresponding to said driver based on prior use of said electric vehicle by said driver, and adjusting said vehicle efficiency based on said estimated auxiliary battery pack loading.

* * * * *